United States Patent [19]

Huang

[11] Patent Number: 4,700,341
[45] Date of Patent: Oct. 13, 1987

[54] STOCHASTIC TIME DIVISION MULTIPLEXING

[75] Inventor: Zheng F. Huang, Fort Lauderdale, Fla.

[73] Assignee: Racal Data Communications Inc., Sunrise, Fla.

[21] Appl. No.: 793,051

[22] Filed: Oct. 30, 1985

[51] Int. Cl.$^4$ .............................................. H04J 3/17
[52] U.S. Cl. ......................................... 370/80; 370/82
[58] Field of Search .................... 370/80, 81, 82, 94, 370/91

[56] References Cited

U.S. PATENT DOCUMENTS

| | | | |
|---|---|---|---|
| 3,124,652 | 3/1964 | Biagi et al. | 370/80 |
| 3,466,397 | 9/1969 | Benowitz et al. | 370/80 |
| 3,686,442 | 8/1972 | Schlichte | 370/81 |
| 3,749,842 | 7/1973 | Poretti | 370/80 |
| 4,096,355 | 6/1978 | Rothauser et al. | 370/89 |
| 4,236,245 | 11/1980 | Freeny et al. | 370/94 |
| 4,334,306 | 6/1982 | Ulug | 370/94 |
| 4,417,334 | 11/1983 | Gunderson et al. | 370/94 |
| 4,445,214 | 4/1984 | Reynolds et al. | 370/94 |
| 4,477,899 | 10/1984 | Kato et al. | 370/94 |
| 4,490,817 | 12/1984 | Turner et al. | 370/94 |
| 4,507,778 | 3/1985 | Tan | 370/94 |
| 4,542,380 | 9/1985 | Beckner et al. | 370/61 |

FOREIGN PATENT DOCUMENTS 0154848 12/1980 Japan .................................... 370/80

997992 7/1965 United Kingdom .

OTHER PUBLICATIONS

"Marketing ISDNs: Reach Out and Touch Someone's Pocketbook" by Marc H. Rudov, Data Communications, Jun. 1984.
"Data Communications Facilities, Networks and Systems Design" by Dixon R. Doll, Wiley-Interscience Publication, John Wiley & Sons, pp. 310–327.

Primary Examiner—Douglas W. Olms
Attorney, Agent, or Firm—Jerry A. Miller

[57] ABSTRACT

Stochastic Time Division Multiplexing (STOTDM) is disclosed. in STOTDM data packets are preceded by a flag word. Each data packet appears in a frame of data packets in a predetermined order. If there is no data to be placed in the packet location, only the flag is transmitted and the data location is allocated to other data. By using a fixed length frame, synchronous data packets can be placed near the beginning of the frame and packets which are not timing sensitive may follow them. A variable length frame may also be used wherein data from a plurality of sources are once again ordered and preceded by a flag word or bit. The flag may be used to indicate whether or not the packet location is filled or this may be determined by control packets. Variable length frames may be accommodated as long as the average bandwidth required to transmit the data does not exceed the channel bandwidth.

14 Claims, 9 Drawing Figures

STOCHASTIC TIME DIVISION MULTIPLEXING

BACKGROUND

1. Field of the Invention

This invention relates generally to the field of multiplexers and demultiplexers. More particularly this invention relates to a method and apparatus for multiplexing and demultiplexing at very high data rates. The invention is particularly useful at data rates greater than 100 MBPS.

2. Background of the Invention

This invention addresses the problem of providing a low cost simple and reliable method and apparatus for multiplexing and demultiplexing packetized data at high data rates.

Many different types of multiplexing techniques are known in the art and are used in various situations to combine multiple sources of data into a single data stream. Some typical examples are Synchronous Time Division Multiplexing (TDM), Statistical Time Division Multiplexing (STATDM) and Packet SWitched Multiplexing (PSWM). The terminology used in connection with Statistical Time Division Multiplexing has not yet been fully standardized. For purposes of this document, STATDM is as defined in conjunction with FIG. 7.8 of the text "Data Communications", by D. R. Doll, Wiley-Interscience Publications, 1978. When any of these techniques are applied to a wideband network they fall far short of providing acceptable performance due to high implementation cost or other drawbacks. For example, with conventional TDM each data source is allocated a predetermined slot of time in a frame of data. If the data source is not providing data at any given time, it's time slot is still reserved and no data is transmitted during the predetermined time interval reserved exclusively for it. Conventional TDM is therefore potentially wastefull of bandwidth when it is used to transmit bursty data or in fact any data which is not likely to be in the form of a continuous stream of data.

STATDM alleviates the problem of poor bandwidth utilization somewhat by allowing statistical allocation of bandwidth according to need. This is generally accomplished by preceding each segment of data by a header including a flag and a field of address information which allows the link level of the STATDM system to determine where each segment of data is to be routed by reading the address. The flag is used to mark the beginning of the segment. Although this technique is more bandwidth efficient, it is substantially more complex to implement due to the requirement of a flag decoder and an address decoder. Moreover, it is very expensive and technically difficult at this time to implement an address decoder at speeds adequate to utilize STATDM above several hundred MBPS.

Packet switching is also difficult to implement at high frequencies for the same reasons as stated above in connection with STATDM. In a PSWM system, data packets are normally preceded by a header including a source address used at each level of the system, a destination address and possibly other information such as packet length. In order to properly route the data packet, this header must be read and interpreted much as in the case of STATDM. Therefore, although PSWM is generally considered to be among the most bandwidth efficient multiplexing techniques, it too is difficult to implement at high data rates. It should also be noted that both STATDM and PSWM are inherently asynchronous and generally require the use of buffering and resynchronization equipment in order to transmit and receive synchronous data.

In general, packet switched networks are capable of higher bandwidth utilization than corresponding circuit switch networks. It is therefore desirable in many instances to replace circuit switched networks with packet switched networks in order to achieve better bandwidth utilization. At very high data rates (for example greater than 100 MBPS) however, it is very difficult or expensive, as previously described, to process data packets due to the very short time available to route the packets. Although the routing problem can be alleviated somewhat by utilization of specialized hardware circuits to perform the packet switching, it is more desirable to utilize microprocessor technology to perform the packet switching so that flexibility of the system is retained. In a microprocessor system, the system can be individually tailored to varying situations by changing the microprocessor's programming.

The present invention provides a method of dealing with these problems by introducing a new type of multiplexing which will be referred to as STOchastic Time Division Multiplexing or STOTDM. This multiplexing technique can be combined with circuit switching and packet switching systems in order to achieve robust packet switching performance at data rates exceeding 100 MBPS. By utilizing standard Emitter-Coupled Logic (ECL) technology, the present invention can be operated as high as 200 MBPS at very low cost. With high speed ECL, speeds approaching 300 MBPS should be achievable. It is anticipated that utilization of gallium arsenide devices and other emerging technologies will permit the present invention to operate reliably at data rates greater than 2 GBPS in many applications.

SUMMARY OF THE INVENTION

It is an object of the present invention to provide an improved multiplexing technique.

It is another object of the present invention to provide a high speed multiplexing technique which retains many of the advantages of packet switching networks while allowing operation at very high data rates using reasonably low cost circuitry.

It is another object of the present invention to provide a multiplexing arrangement which facilitates transmission of synchronous and asynchronous data in a packet like environment.

It is a further object of the present invention to provide a multiplexing arrangement for combining lower speed data channels into very high speed data channels in a cost effective manner.

These and other objects of the invention will become apparent to those skilled in the art upon consideration of the following description of the invention.

In one embodiment of the present invention a method of multiplexing a plurality of N data packets selected from M possible data packets where M is greater than or equal to N, includes the steps of: arranging M possible data packet locations and M flag words into a frame, each flag word and each packet location being associated with a predetermined one of the M possible packets so that each flag word is also associated with a predetermined one of the packet locations, and each flag word preceding its associated packet location; filling N of the M packet locations with the N packets so that each of the N packets fills its associated packet location leaving M-N unfilled packet locations in the frame; and omitting each of the M-N unfilled packet locations while retaining the flag associated with those packet locations so that no packet location is reserved for packets not included in the N packet locations associated with the N packets.

In another embodiment of the present invention method of demultiplexing a frame of STOTDM multiplexed data packets, wherein the frame includes a plurality of sequentially arranged flags, each of which may precede one of the packets or may precede the next successive flag in the absence of a packet, includes the ordered steps of: locating a first flag within the frame; determining if the first flag is followed by a second flag or a first packet; and routing the first packet if it follows the flag. This process is repeated until the entire frame is processed.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

Figure 1:
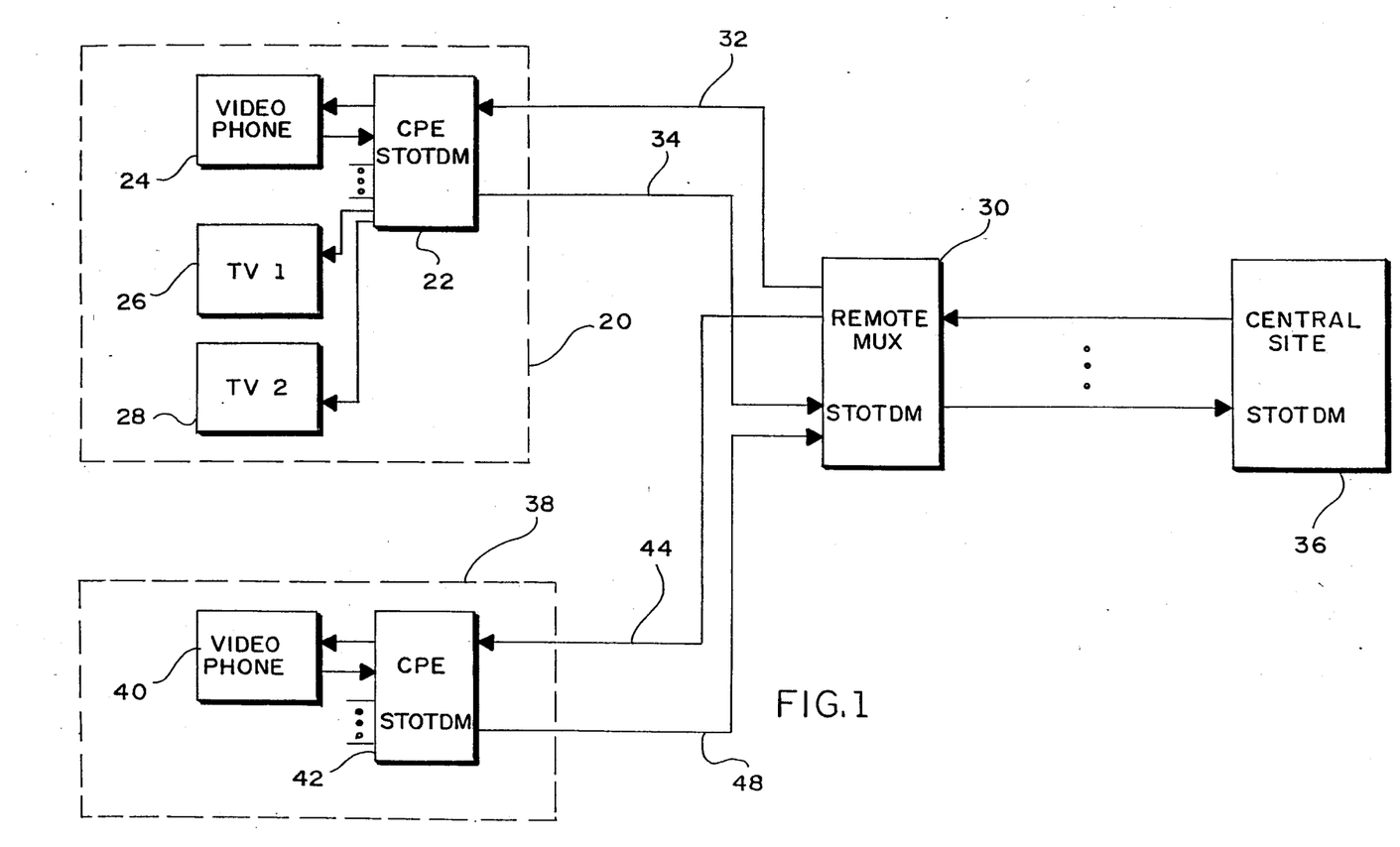
FIG. 1 is a system block diagram of an exemplary system providing video phone communication between two users and T.V. service.

Turning now to FIG. 1 an overall block diagram of an exemplary system utilizing STOTDM is shown. In this exemplary system a system user located at a particular geographic location indicated by 20 utilizes customer premise equipment (CPE) 22 to demultiplex data for video phone 24 and televisions 26 and 28 as well as possibly other services. CPE 22 receives data from and transmits data to remote multiplexer 30 over transmission lines 32 and 34 respectively. In general, the present system may be utilized to receive data more frequently than transmit data. For example, the system may be utilized to receive television signals but is not likely to transmit them (although this condition is not precluded). It is therefore the general case that transmission line 32 may be a substantially higher speed transmission line than transmission line 34.

Remote multiplexer 30 is coupled via a plurality of transmission lines to central site (CS) 36. Central site 36 provides various switching and signal origination functions in a centralized geographic location for distribution to various remote multiplexers located at various other locations.

Figure 2:
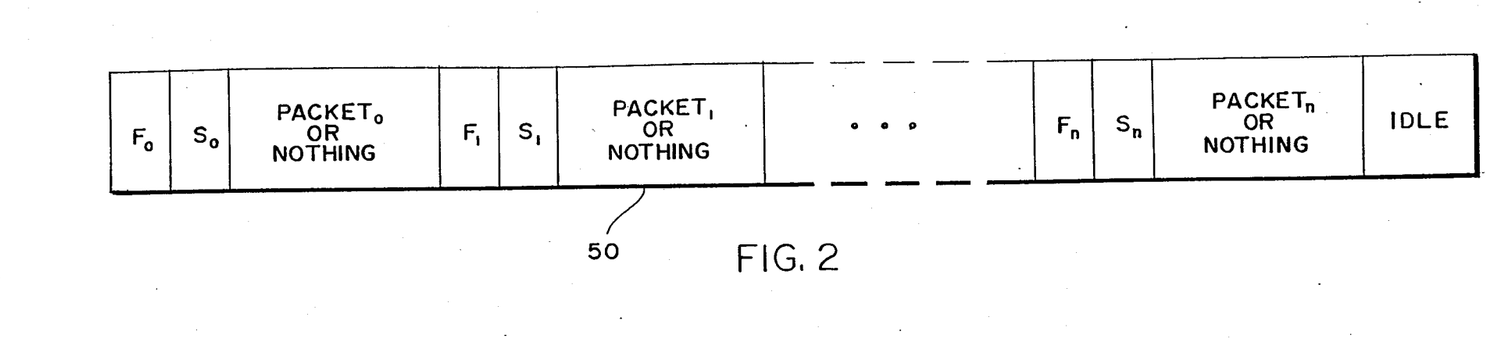
FIG. 2 shows the packet framing arrangement of one embodiment of the present invention.

In order to conduct two way communications such as video phone communication, a second user at location 38 having a similar video phone 40 and CPE 42 is similarly coupled to remote multiplexer 30 via transmission lines 44 and 48. It will be appreciated by those skilled in the art that certain types of data which it would be desirable to transmit over the system of FIG. 1 are most advantageously transmitted in the form of synchronous data. Other types of data such as computer terminal or ISDN (Integrated Services Digital Network) data may be more advantageously implemented in an asynchronous environment. In order to more advantageously accommodate both types of data while effectively utilizing transmission line and bandwidth, the multiplexing scheme illustrated in FIG. 2 is introduced. According to the present multiplexing scheme, each possible data packet is assigned a location sequentially in frame 50. Each packet is preceded by a flag word designated in FIG. 2 as $F_0, F_1 \ldots F_n$.

It should be noted that the present invention may be implemented using either a fixed or a variable length frame. This will be understood more clearly after consideration of the following examples. While the bulk of the present disclosure relates to the use of fixed length frames, the present invention should not be so limited since the fixed length frame is merely a subset of the more general case of the variable length frame. It is generally the case that the variable length frame may be used universally for near optimal bandwidth utilization. However, such use may complicate interfacing to the line somewhat when accomidating synchronous data as will be appreciated more fully after consideration of the present invention. For purposes of this document, the limited embodiment using a fixed frame is used for illustrative purposes since more constraints are imposed in developing such a system than in the general case of a variable length frame. In general, however, the variable frame embodiment is the more bandwidth efficient and therefore more frequently the preferred embodiment.

It should also be carefully noted that according to the preferred embodiment, each of the flags $F_0$ through $F_n$ is an identical binary word which is used to signify the beginning of a packet. Although for purposes of this document each of the flags may be designated using a subscripted notation such as $F_i$, this should not be interpreted as meaning that each of the flags is a different binary word. On the contrary, in the preferred embodiment each of the words is identical. The subscripted notation is merely used here for convenience in identifying each of the individual flags and to clearly associate them with one of the packet locations. It should also be made clear however that it is possible to utilize a limited number of flag words or bits without departing from the spirit of the present invention. In so doing an equal number of flag detectors is utilized. This may be useful in some embodiments in which the value of the flag is used to signify for example that a packet location is full or empty or to indicate the packet length.

In the present embodiment each flag is followed by a binary slot identification word designated $S_0$ through $S_n$ in the figure. Each of the binary words $S_0$ through $S_n$ are unique to the packet which follows it. Preferably, $S_0$ through $S_n$ is a binary word which designates which packet slot location follows. That is, $S_0$ represents slot 0, $S_1$ represents slot 1, etc. For example, if 256 possible packet locations are to be allowed, $S_0$ is preferably assigned to the value 00000000. Similarly, $S_1$ is assigned to the value 00000001 and $S_n$ ($S_{255}$) is assigned the value of 11111111. The binary words $S_0$ through $S_n$ are utilized in the present invention as a mechanism to aid in retaining synchronization at very high speeds and as an error checking device. This word, however, is not to be interpreted as a destination code or destination address as may be utilized in a typical packet switching system since according to the present invention this word is used only as an error check to assure that synchronization is maintained in the system rather than as an address for routing packets.

The present multiplexing arrangement is based upon the use of flags $F_i$. Flag $F_0$ is always transmitted at periodic intervals so by detecting $F_0$ followed $S_0$ a receiving system can always determine where the beginning of frame 50 is. As a result of the periodic occurrence of $F_0$, synchronous information placed in the form of packets may be placed near the beginning of frame 50 in order for synchronous reception of data to be effected. For example, packet 0 may be utilized to contain packetized T.V. data for T.V. 26 of FIG. 1. Similarly, packet 1 may be utilized to carry synchronous T.V. data for T.V. 28. The packet size of packet 0 and packet 1 may be suitably selected to contain for example a single frame or preferably a single line of a T.V. picture. Those skilled in the art will readily recognize that such T.V. data can be easily decoded at the receiver without complex buffering and retiming if the size of frame 50 is selected appropriately along with the size of packet 0 and 1.

According to the fixed frame length embodiment of the present invention, the total size of frame 50 including each possible packet 0 through n may include substantially greater information than the channel is capable of accommodating. However, it is unlikely that any user will be requiring each and every one of the channels available to him at any particular time. Therefore, according to the present invention any packet locations which are not utilized are not transmitted. Therefore, for example, if T.V. 28 is not being utilized and therefore has no need for packet 1, packet 1 is not transmitted. Instead, $S_1$ is immediately followed by $F_2$, thus the time which would be devoted to transmission of packet 1 is now available for other types of communication. This lead to a frame length which varies according to the utilization of the frame. Subject to bandwidth constraints, a channel can therefore be utilized to transmit a large variety of information at varying data rate requirements and the statistics of use of each of the types of data allows a channel with significantly less data capacity than would be required for all possible transmissions to be utilized. The end of frame 50 may be filled in with an idle sequence until time for the next periodic transmission of $F_0$ in the fixed frame length embodiment so that the frame (including idle sequence) is always of same length. In an alternative embodiment, an idle sequence is not required because the length of the frame is allowed to vary according to the amount of data to be multiplexed.

In another embodiment, the present multiplexing technique may be used to multiplex data in frame having no inherent periodic nature. This is the embodiment referred to above as having a variable frame length. That is, $F_0S_0$ is not a periodically recurring event. In this embodiment each frame is structured similar to that of FIG. 2 except that synchronous data is not as readily accommodated and there is no need for an idle period at the end of each frame. At the end of each frame in a variable frame length system, the frame simply starts over again at $F_0S_0$. In the event that no data at all is being transmitted, the repeating pattern of $F_0S_0F_1S_1F_2S_2 \ldots F_nS_n$ is transmitted until one or more of the packets are filled with data. In this embodiment, the input of more data than the bandwidth of the transmission lines will allow simply results in delays in the transmission. Buffering may be required to compensate for such delays. If the data traffic does not exceed the bandwidth of the system on the average, serious delays will not be likely to occur. Buffering and resynchronization may of course be used to accommodate synchronous data traffic with varying degrees of success as will be appreciated by those skilled in the art.

Utilization of a fixed length frame results in a system which is capable of providing synchronous data for simplified interfacing at the expense of bandwidth utilization. It should be noted that in the example to be shown, the frame repetition rate is selected to provide simplified video synchronization. Those skilled in the art will appreciate that other frame rates may be selected to provide, for example, simplified interface to T1 lines etc. A variable frame rate may be used when optimization of bandwidth utilization is more desirable than ease of interface with synchronous devices.

Figure 3:
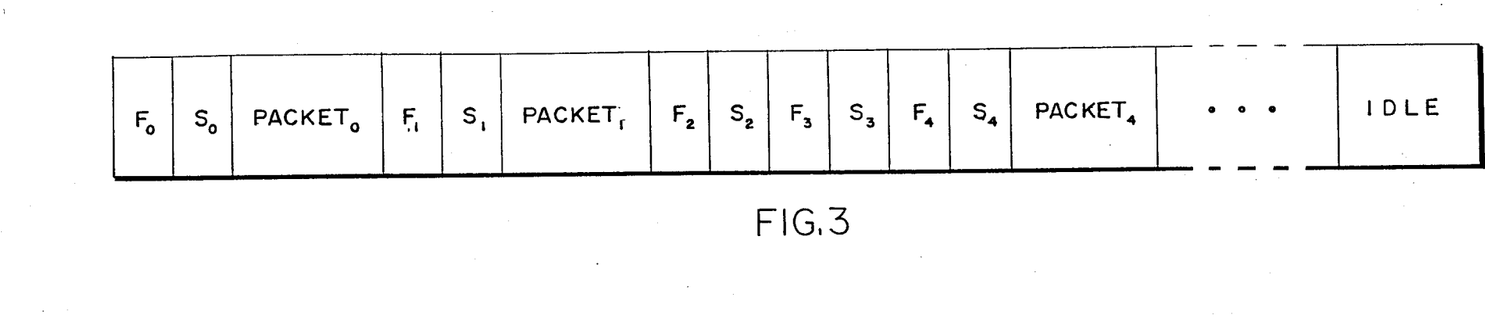
FIG. 3 shows an example frame of packets according to one embodiment of the present invention.

Consider now an example of a frame of packets which might be used according to the preferred embodiment in conjunction with FIG. 1. More particularly, consider an incoming frame of packets on transmission line 32 to CPE 22. For purposes of this example, assume that CPE 22 is capable of accommodating four T.V. channels, one or more video phone channels and a number of data communications channels. As represented in FIG. 1, however, only two of the T.V. channels and one video phone is in use. Since the television channels are very timing sensitive channels, packets of T.V. information are placed at the beginning of the frame. Video phone information is somewhat less timing sensitive and in the present embodiment is placed immediately after the T.V. packets. T.V. packets for the four T.V. channels are placed in locations 0 through 3 and video phone packets for video phone 24 is placed in packet location 4. Since only two T.V. packets are being utilized, two of the T.V. packet locations will be empty. Assume for example, T.V. 26 receives packets 0, T.V. 28 receives packet 1 and video phone 24 receives packet 4. The frame arrangement shown in FIG. 3 is illustrative of a typical frame of data which only includes the packets aforementioned. After $F_0$ and $S_0$ comes packet 0 followed immediately by $F_1$, $S_1$ and packet 1. After packet 1, $F_2$ and $S_2$ are transmitted, but since packet 2 (representing a third T.V. channel) is not to be transmitted $S_2$ is immediately followed by $F_3$ and $S_3$. Similarly $S_3$ is followed immediately by $F_4$ since packet 3 is not to be transmitted. $F_4$ and $S_4$ are followed by packet 4 which contains video phone information for video phone 24. following packet 4, will be the remaining $F_5$, $S_5$ through $F_n$, $S_n$. At the end of the frame an idle code is used to fill in until the next periodic occurrence of $F_0$, $S_0$ is due in the fixed frame length embodiment. One skilled in the art will recognize that the present invention may also be implemented using the variable frame length embodiment.

Figure 4:
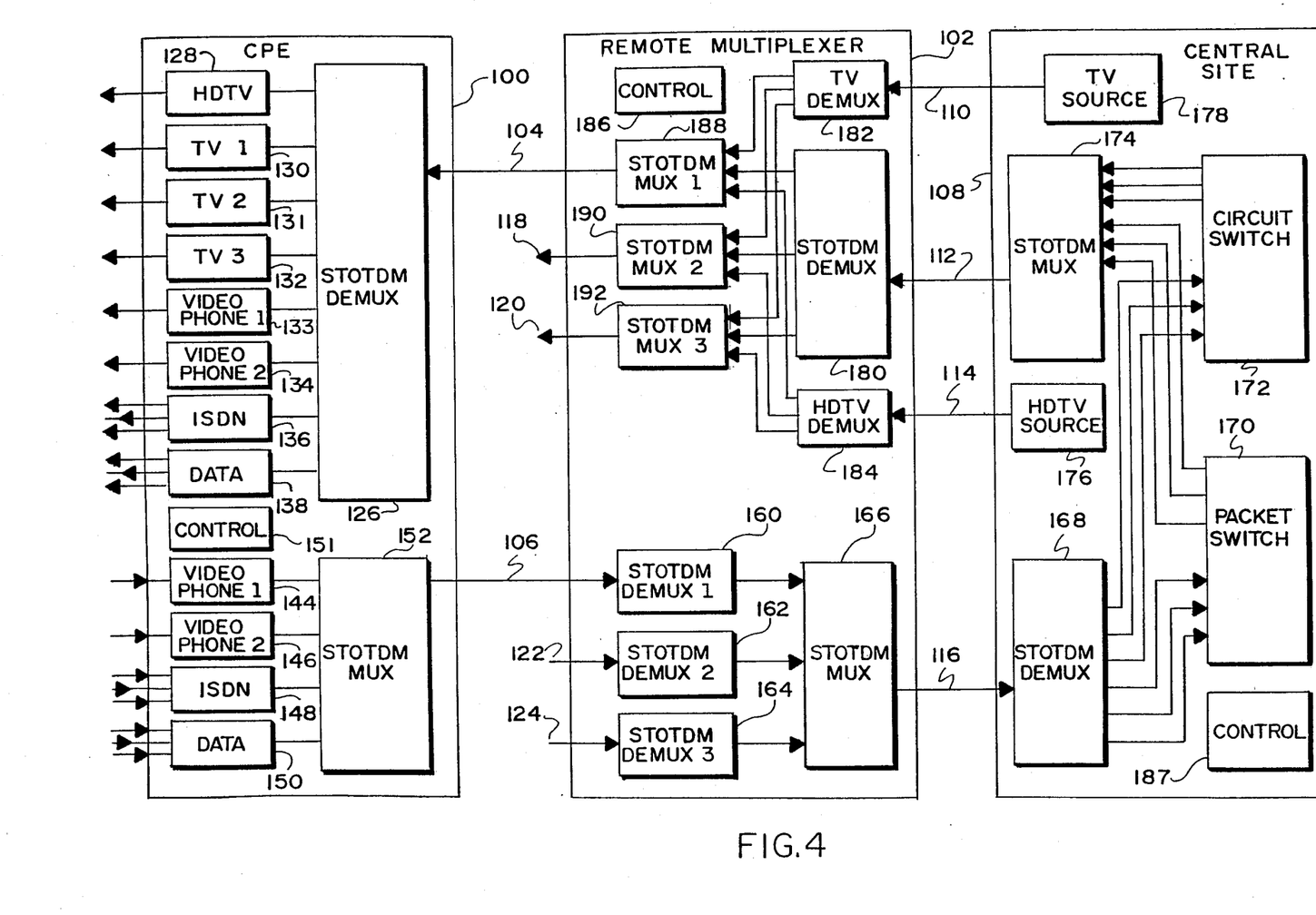
FIG. 4 shows a detailed system block diagram of the components used in a system similar to FIG. 1.

Turning now to FIG. 4, a similar exemplary system is illustrated in detail. It should be noted that the present multiplexing arrangement may be utilized in a very wide variety of applications and the examples used herein to illustrate the concepts of this multiplexing arrangement should not be limiting but should serve merely to illustrate some of the many possible multiplexing arrangements which will occur to those skilled in the art in light of the present invention.

In the example of FIG. 4, CPE 100 is coupled to a remote multiplexer 102 via a fiber optic cable or other high speed transmission line 104. In the preferred embodiment this cable is a 290 MBPS transmission line. This high speed line is used to couple information from the remote multiplexer to the CPE 100. In a similar manner a transmission line 106, which in the present embodiment is a 47.3 MBPS DS3 line, is used to couple data from CPE 100 back to remote multiplexer 102. In the present example a central site 108 is coupled to remote multiplexer 102 via four transmission lines 110, 112, 114 and 116 which are preferably all standard DS4 transmission lines. Remote multiplexer 102 also includes two or more outgoing transmission lines 118 and 120 and two or more incoming transmission lines 122 and 124 which are used to couple to other customer premise equipment not shown in this drawing.

Transmission line 104 carries STOTDM multiplexed data to STOTDM demultiplexer 126 of CPE 100. Demultiplexer 126 then provides demultiplexed data to each of eight (in the present embodiment) interface circuits 128 through 142. Each of the interface circuits 128 through 142 provides varying types of interface functions which depend upon the type of data being manipulated by the interface circuit. For example, in the case of interface circuits 128 through 138, it is probable that analog conversion of the digital data is required in order to drive standard television type devices or video phones. In these devices, buffering may also be necessary as well as circuitry for generation of synchronization information.

In the case of interface circuit 140, it is anticipated that ISDN service will be readily providable by the present network and interface circuit 140 will provide ISDN demultiplexing according to yet to be established standards. Similarly, data interface 142 is likely to provide buffering and demultiplexing functions for a large number of potential data terminals as will be described in more detail later.

It should be noted that high definition T.V. interface 128 will provide outputs to a high definition television system which is also yet to be defined. As of this writing, it is evident that the present system can accommodate high definition T.V. however, it is unclear exactly what bandwidth and format is necessary to provide this service. One skilled in the art will however readily appreciate any modifications required to the present system to accomplish high definition T.V. at such time as HD T.V. is fully defined and standardized.

In the present embodiment it is contemplated that standard NTSC T.V. format will be utilized in the present invention. As such, each standard T.V. packet (packets 1 through 3 inclusive) will contain a single line of video information. In order to provide synchronous transmission, the frame repetition rate for the frame of packets is set to 15,750 hertz, that is, $F_0S_0$ repeats itself every 63.49 microseconds. This allows for a total maximum frame length of approximately 18,412 bits.

Figures 5, 6:
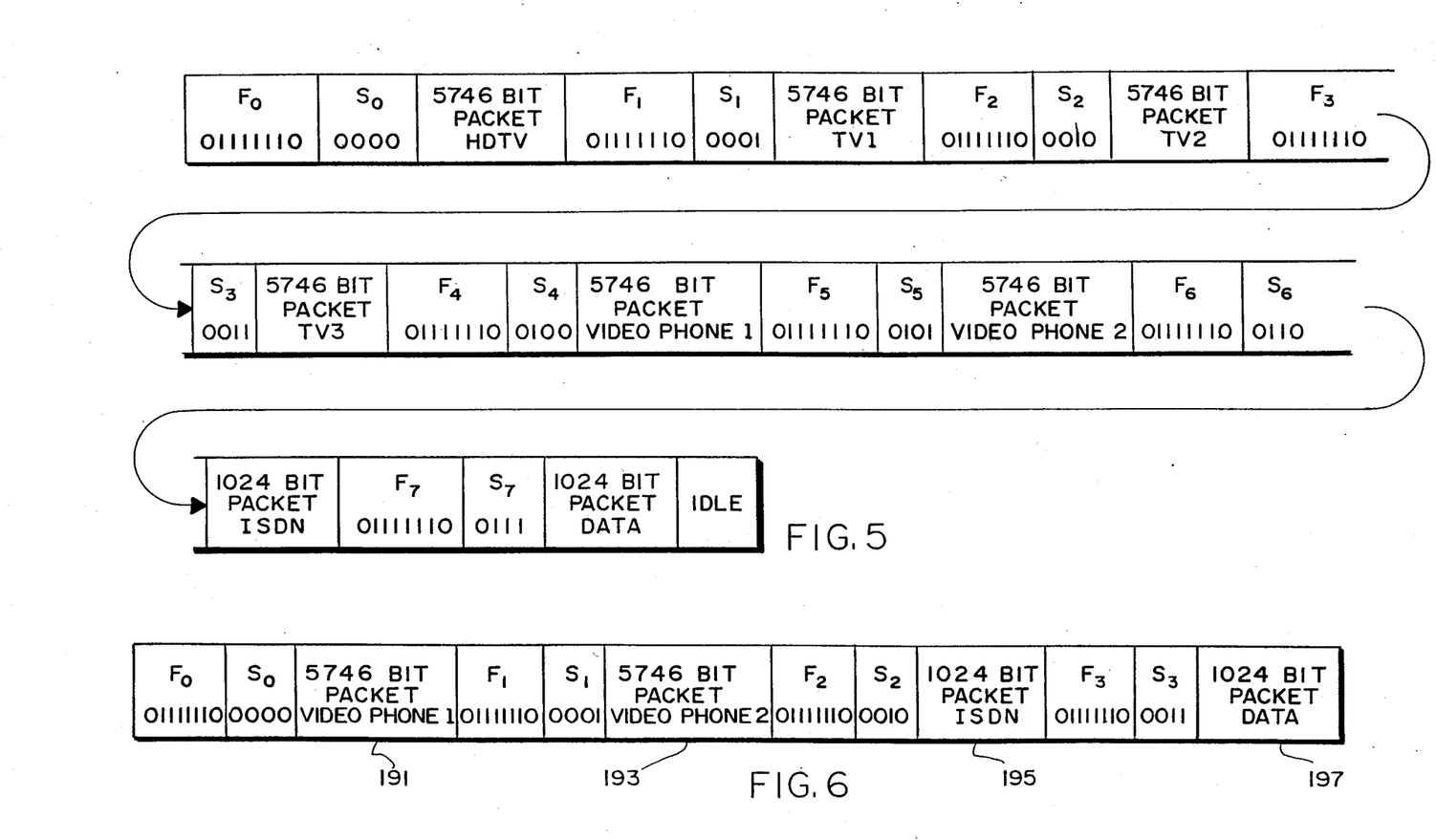
FIG. 5 shows the frame arrangement for the system of FIG. 4 at transmission line 104, with each packet location shown.
FIG. 6 shows the frame arrangement of FIG. 4 at transmission line 106 with each packet location shown.

Turning to FIG. 5, the frame format for the present frame to be transmitted on transmission line 104 is shown. It should be emphasized however that not all of the eight data packets shown can be included in each frame. It is clear by merely adding the number of bits used for flags, packets and S bits that this is the case. The total number of bits shown in FIG. 5 is 36,620. Clearly, with the 15,750 hertz frame repetition constraint and the 290 MBPS channel rate, any given frame can not accommodate all of the bits shown in FIG. 5. According to the present invention of course STOTDM is utilized to provide each of the options illustrated in FIG. 5 subject to the constraints of maximum loading of channel 104. For example, any three of the large packets (5,746 bits) may be transmitted at a given time but, this results in a total of 17,334 bits leaving room for only one of the short packets. In this instance about 54 bits of idle are transmitted at the end of the frame.

Similarly, if only two of the large packets are transmitted in a given frame the total number of bits required is 11,588 (including F and S bits). This allows plenty of room for one or both of the two shorter packets (6 and 7) to be transmitted. Obviously, full bandwidth utilization is not achieved in this situation but using the frame repetition rate of 15,750 Hz considerably simplifies the synchronization of the synchronous packets.

It should be noted that although only 1K bits of information is provided for in packets 6 and 7, due to the very high frame repetition rate of 15,750 hertz, the effective data rate of the information transmitted in either of the smaller packets is approximately 16.128 MBPS. This is adequate to accommodate 13,440 multiplexed 1,200 BPS channels or 1,680 multiplexed 9600 BPS channels in packet 7 alone. Therefore, although the packets may appear small, a tremendous amount of data can be transmitted in those packets.

According to FIG. 5, $S_0$ through $S_7$ are transmitted as four bit words. The three least significant bits are preferably used as a counter to provide for synchronization checks as will be described later. The most significant bit is shown as 0 in FIG. 5 in all cases. This bit is presently reserved for possible use in accommodating system expansion to 16 possible packet locations or in order to accommodate final definition of HDTV. That is, by making the most significant bit of $S_0$ a binary 1 demultiplexer 126 can interpret that bit as an indication that more than one packet is being utilized in conjunction with HDTV. In an alternative embodiment of the present invention, even more bits are allocated to the S words (for example 8 bits) so that the S word can be utilized for greater system versatility while only sacrificing a very small amount of overhead. Those skilled in the art will recognize other potential uses of such control words.

It should also be noted that the data on line 104 could be multiplexed using the variable frame length STOTDM. In so doing, the bandwidth efficiency would be substantially enhanced allowing a lower speed line to accommodate the same amount of data as the 290 MBPS channel above. Of course, this additional bandwidth efficiency is gained at the expense of ease of handling synchronous data.

Referring back to FIG. 4, outbound data from CPE 100 on line 106 can contain information multiplexed from interface circuits 144 through 150. An STOTDM multiplexer 152 is used to assemble a frame of data as shown in FIG. 6. By utilization of appropriate data compression techniques, video phone signals may occupy approximately 20 MBPS each so that the present system may accommodate all four of the interface circuits 144 through 150.

Since none of the data on line 106 is very timing sensitive, a fixed frame length is not necessary and packets 191, 193, 195 and 197 may contain either data or nothing in accordance with the STOTDM process. In the instances where all four packets are full, they will all be sequentially transmitted. Due to the bursty nature of the ISDN and data channels, it is likely that all four channels can be accommodated using the standard 47.3 MBPS line. As long as the data on the average requires less than the 47.3 MBPS available the present system will operate efficiently without significant delays in data.

It should be noted that the present invention contemplates providing standard telephone service in addition to video phone service by utilizing the provisions of ISDN for digital telephone communication. One skilled in the art will recognize that CPE 100, remote multiplexer 102, and central site 108 also require various control functions in order to correctly multiplex the data as described. This function is provided by utilizing control packets or call set up packets on the ISDN. These packets may be mailed throughout the system on the ISDN D channel. In this manner, call setups and central site switching functions are accomplished in order to condition the system appropriately for changes in, for example, TV channel or videophone call setup.

Central site 108 is utilized to effect the various switching functions required by the present system. In addition, the present embodiment contemplates that the various T.V. signals such as ordinary T.V. channels and high definition T.V. will be distributed via the central site, but this is not to be limiting.

In the remote multiplexer 102, STOTDM multiplexed signals from channels 106, 122, 124 (and possibly others) are demultiplexed by STOTDM demultiplexer 160, 162 and 164. The demultiplexed signals are then combined by STOTDM multiplexer 166 in preparation of transmission over a signal transmission line 116 using variable frame length STOTDM in the preferred embodiment. The multiplexed frame of packets present on transmission line 116 is demultiplexed at a STOTDM demultiplexer 168 in the central site. The output of STOTDM demutiplexer 168 is distributed to a packet switch 170 and a circuit switch 172 where more or less conventional packet switching and circuit switching take place to accommodate the various types of data. ISDN data and data from interface 150 will likely lend themselves more to packet switching than to conventional circuit switching and are therefore handled by packet switch 170. Video phone data on the other hand is more readily adapted to circuit switching and will be handled by circuit switch 172. When the appropriate routing is completed in switches 170 and 172 their outputs are STOTDM multiplexed by variable frame length STOTDM multiplexer 174. Therefore, a frame of STOTDM multiplexed data is provided to remote multiplexer 102 via transmission line 112. HDTV signals are also provided by central site 108 via a source of HDTV signals 176 for transmission on transmission line 114. Similarly, a source of standard television signals 178 provides multiplexed T.V. channels on transmission line 110.

At remote multiplexer 102, the STOTDM multiplexed data on transmission line 112 is received by an STOTDM demultiplexer 180. Also, multiplexed T.V. signals are received by a T.V. demultiplexer 182 and high definition T.V. signals are received by a HDTV demultiplexer 184. According to selection made at the CPE 100, a controller 186 selects appropriate outputs from T.V. demultiplexer 182, STOTDM demultiplexer 180 and HDTV demultiplexer 184 which are provided to STOTDM multiplexer 188 for transmission over transmission line 104. In a similar manner, T.V., HDTV and data are multiplexed by STOTDM multiplexers 190 and 192 for transmission on transmission lines 118 and 120.

Of course it would be appreciated by those skilled in the art that the above example directed toward a home subscriber or business subscriber type network for providing various one way and two way communication services are but one example of the use of STOTDM. STOTDM can also readily be used for point to point multiplexed communication and may even be used in local area network circuit arrangements.

Figure 7:
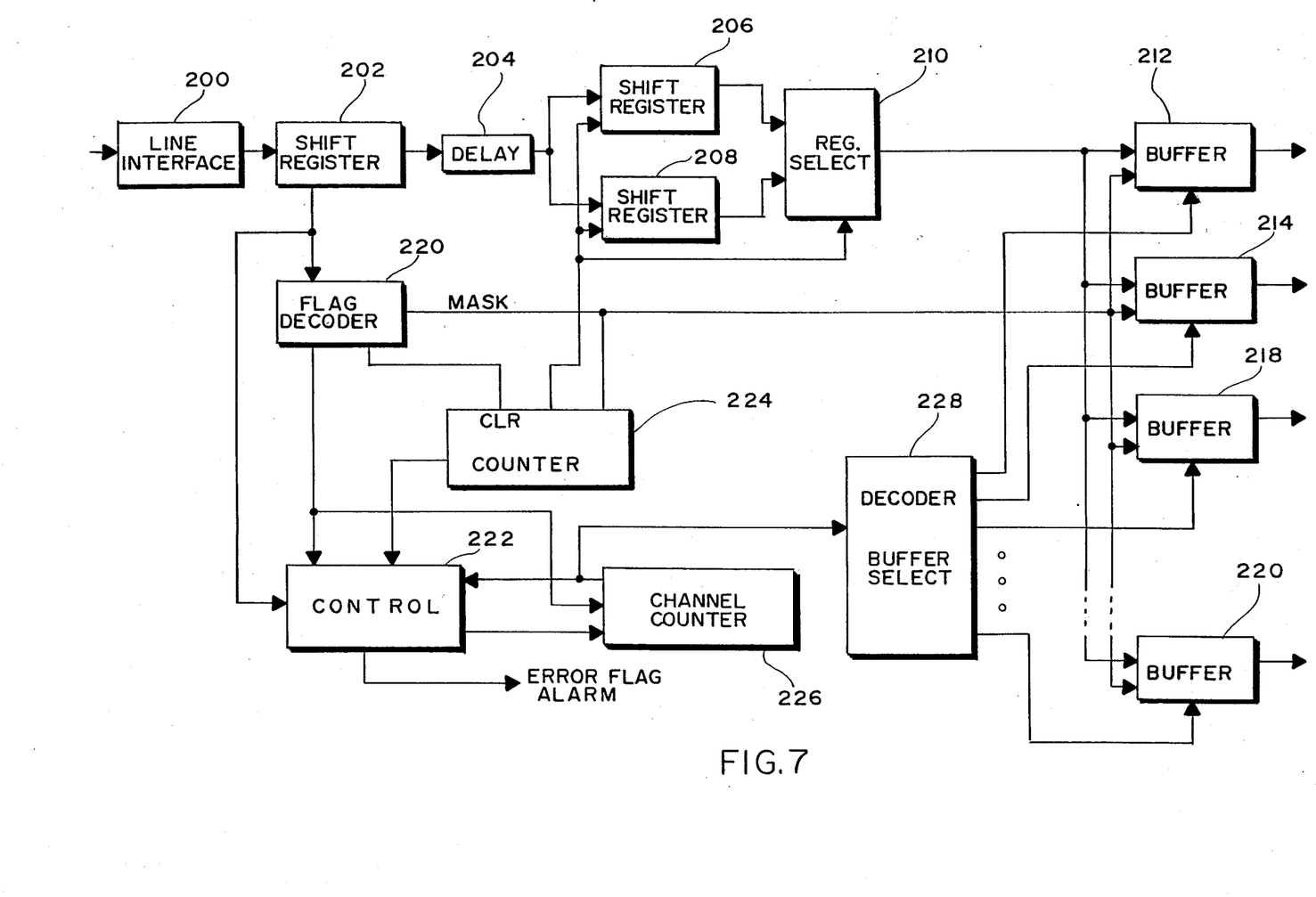
FIG. 7 shows a more detailed block diagram of the functional elements of an STOTDM demultiplexer.

Turning now to FIG. 7, an exemplary embodiment of a demultiplexer for STOTDM data is shown. This demultiplexer, with minor variations, can be used for either fixed or variable frame length STOTDM as will be clear to those skilled in the art. In this embodiment, STOTDM data is received by a line interface 200 which provides for logic level conversion, noise filtering, etc. For the case of fiber optic transmission lines, line interface 200 may also provide conversion from light energy to electrical logic signals. Line interface 200 also includes preferably phase locked loop based circuitry for extracting clock information from the incoming stream of data. This clock extraction circuitry is not shown, but one skilled in the art will readily understand how to provide such function so that appropriate timing of the logic circuit of FIG. 7 may be accomplished. The output of line interface 200 is coupled to a shift register 202 the serial output of which is passed through a delay 204 to accomplish appropriate timing correction and from there to the inputs of serial in, parallel out shift registers 206 and 208. The outputs of shift registers 206 and 208 are applied through a register selection switch 210 to the input of one of a plurality of buffers 212 through 218. Of course the number of buffers at any given system depends on the exact nature of the STOTDM signal to be demultiplexed. Shift register 202 is also coupled to a flag decoder 220 which is used to detect the flag pattern used at the start of or preceding every data packet location. Shift register 202 is also coupled to a controller 222 which oversees operation of several aspect of the demultiplexer. Preferably, controller 222 is based upon a high speed microprocessor. Flag decoder 220 is also connected to a counter 224 and to a mask output of flag decoder 220 which is also coupled to each of buffers 212 through 218. An output of controller 220 is coupled to a channel counter 226 and to a decoder 228 which is used to select one of the buffers 212 through 218. Controller 222 also inspects the S words for errors and provides error flags and error alarms as required when an error is detected.

When a flag word arrives at shift register 202, signifying the beginning of a packet, flag decoder 220 generates an output pulse to clear counter 224. During receipt of all but the first eight bits and the last four bits of a packet, the flag decoder is masked by counter 224 so that flag decoder 220 will not respond to the predetermined flag pattern as it appears within the body of a message packet. In this manner, the flag pattern does not have to be excluded from the user's messages. The first eight bits of the packet are not masked since if no packet is being transmitted the first eight bits will actually be the flag which indicates that the packet location is empty and the packet length has been shortened to zero. When the next flag is detected, the counter is once again cleared. During the last four bits of a data packet, the decoder is unmasked in preparation for receipt of the next flag. In this manner even if there exists fewer than four timing errors the system can continue to function.

Due to the extremely high data rates, timing problems can be critical to the present invention. Controller 222 determines from the incoming data at shift register 202 and flag decoder 220 exactly where the frame is. By comparing the redundant S words with the output of channel counter 226, controller 222 is able to determine that the system is in synchronization. If more than three errors occur, so that the system is unable to resynchronize itself in the middle of a frame, a red alarm will be set and the system searches for the combination $F_0S_0$ in order to regain synchronization.

The bulk of the circuitry described may be implemented using standard 100k series ECL which may operate at data rates up to 200 MBPS. By utilizing specially selected high speed ECL parts, the circuit is capable of operating at the desired 290 MBPS. The serial data is converted at shift registers 206 and 208 to parallel data so that low cost CMOS random access memory can be utilized for buffer and many of the control function. By utilizing gallium arsenide technology and other technologies which are faster than the high speed ECL standard logic family, the present invention can readily operate at speeds approaching 2 GBPS.

Figure 8:
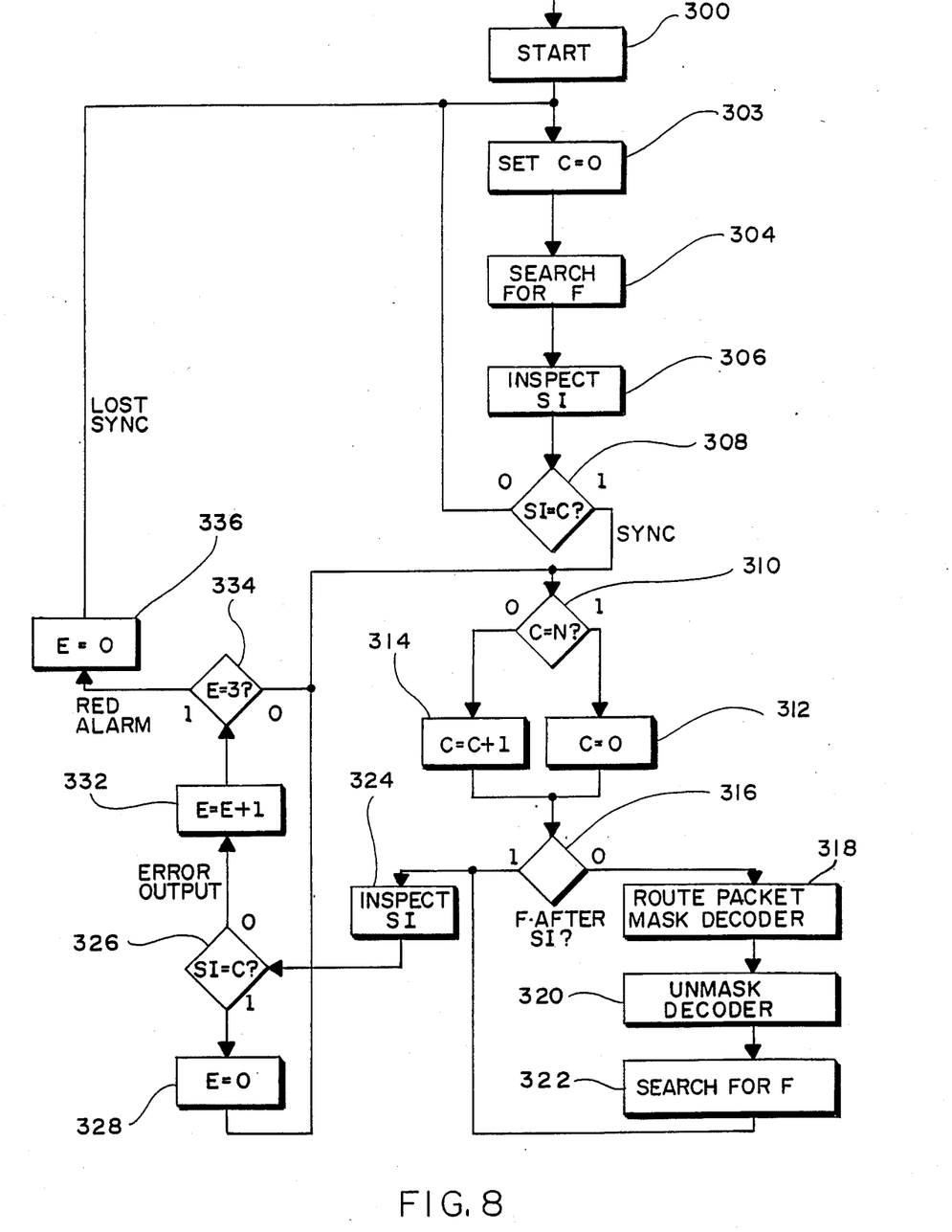
FIG. 8 shows a flow diagram of the process of demultiplexing an STOTDM signal arranged according to the packet frame arrangement of FIG. 2.

Turning now to FIG. 8, a flow chart illustrates the flow of operation of the demultiplexer according to the present invention. The process begins at step 300 and at step 302 the counter is set to 0. At 304 the system begins searching for the flag pattern and when it finds a flag pattern $S_i$ is inspected. At 308 $S_i$ is compared with the counter's count and if the count is the same, the system is known to be in synchronization. If not, the system is known to be out of synchronization and the counter is once again set to 0 at step 302. If the system is in synchronization next the count is inspected to determine if it is equal to small n, that is the final packet. If so, the counter is reset to 0 at step 312 and if not the counter is incremented by one in step 314. At step 316, the data immediately following $S_i$ is inspected to determine if it is a flag or data. If it is data, the packet is appropriately routed to its destination buffer at 318. After the first eight bits of the packet pass the decoder, it is masked to avoid detection of the flag pattern in data. At step 320 corresponding to the final four bits of the data, the decoder is unmasked and at 322 the flag decoder searches for the flag pattern again. After the flag pattern is found, in step 324 $S_i$ is inspected and at 326 $S_i$ is compared with the count C. If the count is equal to $S_i$ then the number of errors that have occurred is equal to 0 presumably and control is passed to step 310. Otherwise, at step 332, the error counter is incremented and at step 334 the number of errors is compared with three. If the number of errors is not equal to three then control is passed back to step 328 otherwise it is deemed that a red alarm has occurred and the error counter is set to 0 at step 336. Control is then passed back to step 302 where the counter is set to 0. The process once again begins looking for the beginning of the frame signified by $F_0$, $S_0$. Of course many variations of this process may be utilized without deviating from the spirit of the present invention.

Those skilled in the art will recognize that many variations to the present multiplexing arrangement may be devised without departing from the teachings of the present invention. For example, in an alternate embodiment shown in FIG. 9 which is more suitable to low speed, low overhead situations, the packets are arranged in a frame as shown. In order to distinguish the beginning of the frame, a unique frame start word is utilized. Following the frame start word a flag word or single bit is transmitted following by a either a packet or nothing as in the preferred embodiment. In this embodiment, flag 0 for example could be a single bit in which case a 0 indicates that the following bits are a packet of predetermined length. If however, $F_0$ is a 0 the packet will not be utilized the following bit is $F_1$. Similarly, if flag one is a 1, packet one is transmitted and if $F_1$ is a 0 nothing is transmitted and the next bit will be $F_2$. In both examples, the flag is used to signify that the predetermined packet location follows. In the first example each flag was identical and the presence or absence of a flag after the S word determines whether the packet is present or not. In the second example, actual characteristics of the flag itself are utilized to determine if a packet is present. In each case the routing of the flags is accomplished by utilizing a predetermined order of packet locations. When packets contains no data, the output buffer for that packet receives no data and is effectively skipped and the next sequential buffer is addressed if a packet is present for receipt by the buffer.

Figure 9:
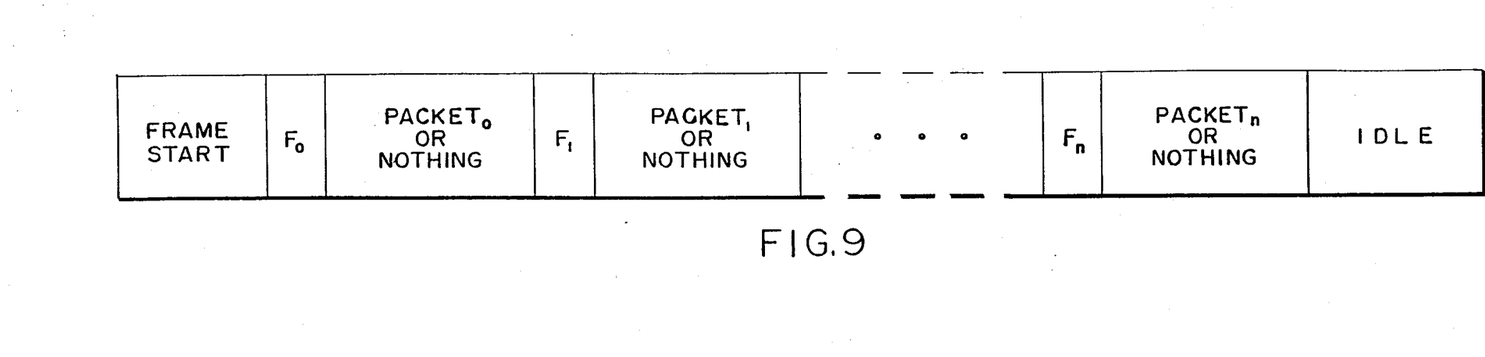
FIG. 9 shows an alternate embodiment of the packet framing arrangement of the present invention.

In a minor variation to the scheme of FIG. 9, $F_0S_0$ may be used to determine the start of a frame in a manner similar to the first example. The remaining S words are omitted entirely and operation is analogous to the embodiment of FIG. 9. Those skilled in the art will recognize many variations of the present invention.

Utilization of this scheme provides many advantages, not the least of which is substantial reduction of complexity of very high speed circuits. At the data rates mentioned in the present embodiment, conventional packet switching is accomplished only very slowly by actually reading destination addresses embedded as a header in each packet. In order to accomplish this, the packet must generally be placed in a buffer and read at lower speed by a computer. The header is then analyzed to determine where to send the packet and the packet is once again put in serial form for transmission. This process is very slow and can result in unacceptable delays especially in digitized voice transmission. The present invention however is capable of operating at substantially lower overhead in many instances and very high speeds without need for disassembly and reassembly of the packets to determine the destination, thus simplifying the hardware and facilitating very high speed communications. Also, for voice communications the present invention facilitates very rapid switching rates and very low delay so that digital voice can be readily implemented without the delay problems frequently encountered when other packeting techniques are utilized.

The present invention provides many of the advantages of ordinary packet switching while enabling very rapid data rates to be utilized while avoiding the cost of packet switches. The switching which is utilized in central sites with the present invention may be either packet switches or circuit switches depending on the type of data to be Switched. In some instances as illustrated previously, it may be advantageous to utilize both types of switches. For example X25 aggregates and ISDN channels are preferably provided packet switching at the central site. In addition, other types of data than those mentioned can readily be accommodated by the present invention. For example, ETHERNET can be readily implemented in the data slot of the frame and with protocol translation virtually any type of digital information can be transmitted transparently through the present system utilizing STOTDM.

Thus it is apparent that in accordance with the present invention an apparatus that fully satisfies the objectives, aims and advantages is set forth above. While the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

What is claimed is:

1. A method of multiplexing a plurality of N data packets selected from M possible data packets where M>N, comprising the steps of:
    arranging M possible data packet locations and M flag words into a frame, each flag word being identical to the other flag words, each flag word and each packet location being associated with a predetermined one of said M possible packets so that each said flag word is also associated with a predetermined one of said packet locations, and each said flag word preceding its associated packet location;
    filling N of said M packet location with said N packets so that each of said N packets fills its associated packet location leaving (M-N) unfilled packet locations in said frame; and
    omitting each of said (M-N) unfilled packet location so that no packet location is reserved for packets not included in said N packet locations associated with said N packets.

2. A method of demultiplexing a frame of STOTDM multiplexed data packets, wherein said frame includes a plurality of sequentially arranged flags, each of which may precede one of said packets or may precede the next successive flag in the absence of a packet, the method comprising the ordered steps of:
    (a) locating a first flag within said frame;
    (b) determining, by inspection of information following said first flag, if said first flag is followed by a second flag or a first packet; and
    (c) routing said first packet if it follows said first flag.

3. The method of claim 2, further comprising the steps of:
    detecting a word associated said first flag; and comparing said word with a stored word to verify synchronization.

4. The method of claim 2, further comprising the steps of:
    (d) determining if said second flag is followed by a third flag or a second packet; and
    (e) routing said second packet if it follows said second flag.

5. A method of demultiplexing a frame of STOTDM multiplexed data packets, wherein said frame includes a plurality of identical sequentially arranged flags, each of which may precede one of said packets or may precede the next successive flag in the absence of a packet, the method comprising the ordered steps of:
    (a) locating a first flag within said frame;
    (b) looking for a second flag after said first flag;
    (c) routing a first packet if said second flag is not found in step (b); and
    (d) looking for said second flag after said first packet is routed if said second flag is not found in step (b).

6. A method of demultiplexing a frame of STOTDM multiplexed data packets, wherein said frame includes a plurality of identical sequentially arranged flags, each of which may precede one of said packets or may precede the next successive flag in the absence of a packet, the method comprising the ordered steps of:
    (a) reading a first flag and determining by inspecting information following said first flag whether or not a first packet follows said first flag;
    (b) reading a second flag after step (a) if said first packet does not follow said first flag; and
    (c) routing said first packet after step (a) if said first packet does follow said first flag.

7. An apparatus for demultiplexing a stochastic time division multiplexed frame of data packets, comprising:
    detecting means for detecting a predetermined flag pattern within said frame of data packets;
    counting means for counting the number of flag patterns detected by said detecting means; and
    routing means, responsive to said counting means, for routing a data packet in accordance with said number of flag patterns.

8. The apparatus of claim 7, further comprising:
    framing means for detecting the first flag pattern in said frame; and
    means responsive to said detecting means for resetting said counting means.

9. The apparatus of claim 7, further comprising:
    masking means for inhibiting said detecting means during a portion of said data packets so that data packets may include said flag pattern within their data without causing said counting means to count.

10. The apparatus of claim 7, further including means for reading a word associated with said flag and for comparing said word with the number of flag patterns detected by said detecting means for verifying synchronization.

11. The apparatus of claim 7, wherein said frame is a fixed length so that a first flag pattern reoccurs periodically.

12. The apparatus of claim 7, wherein said frame has a variable length.

13. The apparatus of claim 7, further comprising:
    comparing means for comparing the number of said flag patterns detected by said detecting means with a count in said frame; and
    error detecting means for producing an error signal in response to said comparing means if said count and said number do not agree.

14. The apparatus of claim 11 wherein said frame includes an idle pattern at the end of said frame to fill in the frame until time for the next recurring flag pattern.

* * * * *